United States Patent
Golle et al.

(10) Patent No.: US 10,351,246 B2
(45) Date of Patent: Jul. 16, 2019

(54) AIRCRAFT AIR CONDITIONING SYSTEM THAT IS OPERABLE ASSISTED BY CABIN EXHAUST AIR WITH AN ELECTRICALLY POWERED AMBIENT AIR COMPRESSOR

(71) Applicant: AIRBUS OPERATIONS GMBH, Hamburg (DE)

(72) Inventors: Steffen Golle, Dresden (DE); Enrico Klausner, Dresden (DE); Mario Raddatz, Coswig (DE); Ullrich Hesse, Affalterabach (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/822,632

(22) Filed: Nov. 27, 2017

(65) Prior Publication Data

US 2018/0148183 A1   May 31, 2018

(30) Foreign Application Priority Data

Nov. 28, 2016  (DE) .................... 10 2016 223 528

(51) Int. Cl.
*B64D 13/06* (2006.01)
*B64D 13/08* (2006.01)

(52) U.S. Cl.
CPC ............. *B64D 13/08* (2013.01); *B64D 13/06* (2013.01); *B64D 2013/0648* (2013.01);
(Continued)

(58) Field of Classification Search
CPC ........................... B64D 13/08; B64D 13/0648; B64D 13/0662; B64D 13/0688; B64D 13/06
See application file for complete search history.

(56) References Cited

U.S. PATENT DOCUMENTS

| 4,021,215 A | 5/1977 | Rosenbush et al. |
| 2003/0051500 A1 | 3/2003 | Asfia et al. |

(Continued)

FOREIGN PATENT DOCUMENTS

| DE | 2715090 A1 | 11/1977 |
| DE | 102015207436 A1 | 10/2016 |

(Continued)

OTHER PUBLICATIONS

Golle et al., "New Approaches for the Environmental Control System in Aircrafts with the Application of a Vapor Compression Cycle", DKV-Tagung, pp. 1-8, dated 2015.

(Continued)

*Primary Examiner* — Elizabeth J Martin
(74) *Attorney, Agent, or Firm* — Jenkins, Wilson, Taylor & Hunt, P.A.

(57) ABSTRACT

An aircraft air conditioning system includes an ambient air line connected to an air conditioning system mixer to supply ambient air, and a cabin exhaust air line connectable to an aircraft cabin for being flown through with cabin exhaust air. An ambient air compressor in the ambient air line compresses ambient air in the ambient air line. A refrigerating apparatus includes a refrigerant circuit and a refrigerant compressor in the circuit. The refrigerant circuit is thermally coupled to the ambient air line to transfer heat from ambient air line air to refrigerant circulating in the circuit before the ambient air is supplied to the mixer. A turbine is coupled to the air compressor. A control device controls the air conditioning system wherein in a first operating state the turbine receives air from the ambient air line, and in a second operating state receives cabin exhaust air.

20 Claims, 1 Drawing Sheet

(52) U.S. Cl.
CPC .......... *B64D 2013/0662* (2013.01); *B64D 2013/0674* (2013.01); *B64D 2013/0688* (2013.01); *Y02T 50/56* (2013.01)

(56) References Cited

U.S. PATENT DOCUMENTS

| | | |
|---|---|---|
| 2014/0144163 A1 | 5/2014 | Klimpel et al. |
| 2015/0013355 A1* | 1/2015 | Klimpel .......... B64D 13/08 62/89 |
| 2016/0083100 A1* | 3/2016 | Bammann .......... B64D 13/06 62/89 |
| 2018/0148184 A1 | 5/2018 | Golle |

FOREIGN PATENT DOCUMENTS

| | | |
|---|---|---|
| EP | 2735510 A1 | 5/2014 |
| EP | 2821346 A1 | 1/2015 |

OTHER PUBLICATIONS

German Search Report for German Application No. 102016223528.1 dated Oct. 10, 2017.
German Search Report for German Application No. 102016223521.1 dated Oct. 10, 2017.

* cited by examiner

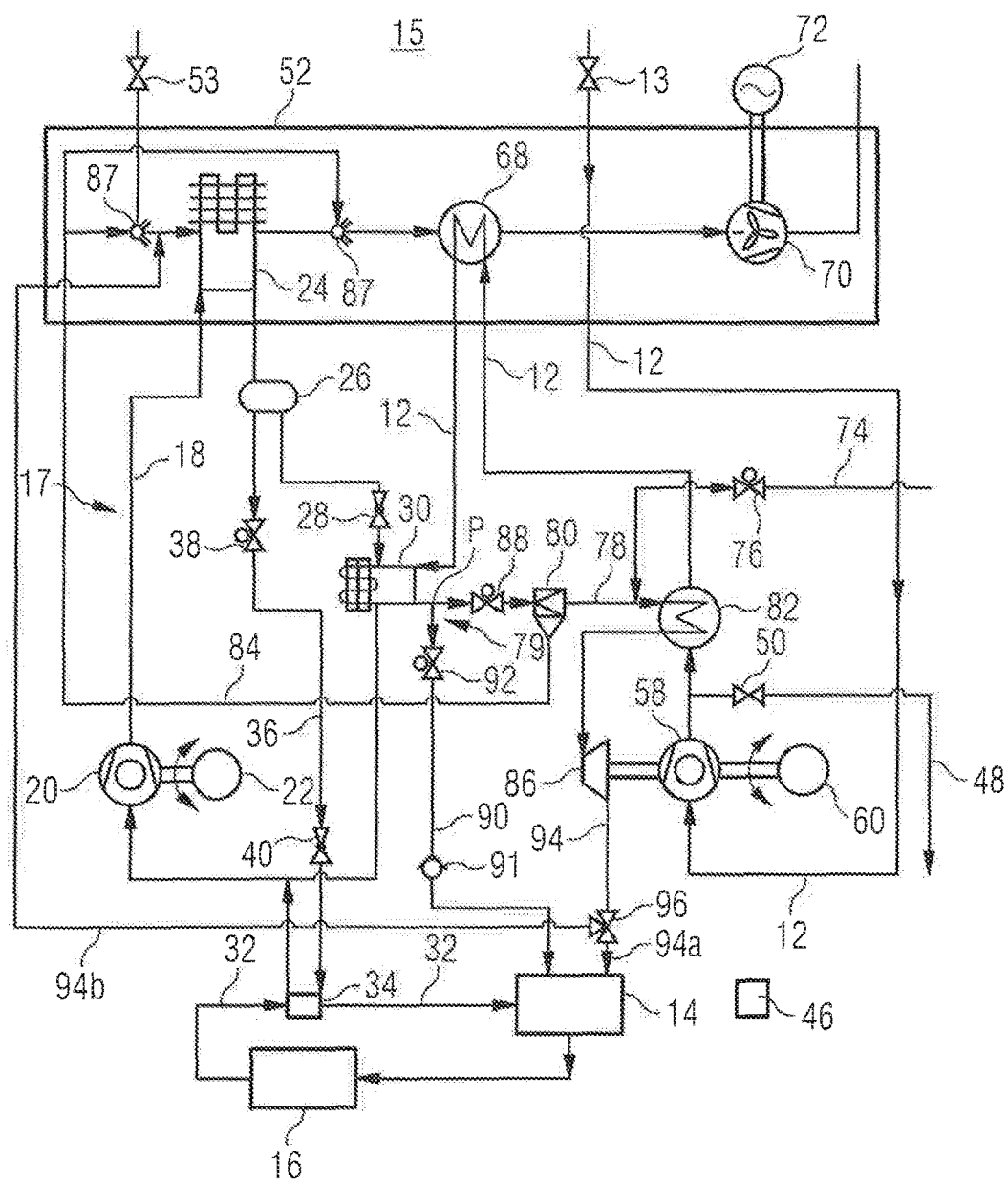

AIRCRAFT AIR CONDITIONING SYSTEM THAT IS OPERABLE ASSISTED BY CABIN EXHAUST AIR WITH AN ELECTRICALLY POWERED AMBIENT AIR COMPRESSOR

CROSS-REFERENCE TO RELATED APPLICATION

This application claims priority to German patent application DE 10 2016 223 528.1 filed Nov. 28, 2016, the entire disclosure of which is incorporated by reference herein.

TECHNICAL FIELD

The disclosure herein relates to an aircraft air conditioning system and a method for operating an aircraft air conditioning system.

BACKGROUND

An aircraft air conditioning system is used to set and maintain a desired pressure, a desired temperature and a desired air humidity in an aircraft cabin. Moreover, the aircraft air conditioning system supplies sufficient fresh air to the aircraft cabin to ensure that a prescribed minimum amount of fresh air is available in the aircraft cabin. An aircraft air conditioning system is known from EP 2 735 510 A1 and US 2014/0144163 A1 in which a refrigerating apparatus operated using a two-phase refrigerant is used to cool ambient air compressed by a multistage compressor. The refrigerating apparatus comprises a refrigerant circuit, arranged or disposed in which are a compressor, a liquefier, an expansion valve and an evaporator, through which ambient air that is to be cooled flows. Bleed air drawn from an engine or an auxiliary power unit of the aircraft is used to power the compressor of the refrigerating apparatus and to power the multistage compressor for compressing the ambient air.

SUMMARY

An object of the disclosure herein is to provide an aircraft air conditioning system that facilitates energy-efficient air conditioning of an aircraft cabin. An object of the disclosure herein is also to specify a method for operating such an aircraft air conditioning system.

This object is achieved by an aircraft air conditioning system and a method for operating an aircraft air conditioning system with features such as those described herein.

An aircraft air conditioning system comprises an ambient air line configured or adapted to be flown through with ambient air and being connected to a mixer of the aircraft air conditioning system to supply the mixer with ambient air drawn from an aircraft environment. The supply of ambient air to the ambient air line can be controlled by a valve arranged or disposed in the ambient air line. The mixer connected to the ambient air line can be a pre-mixer or a main mixer of the aircraft air conditioning system, to which recirculation air discharged via a recirculation air line from an aircraft cabin to be air conditioned by the aircraft air conditioning system can be supplied in addition to the ambient air from the ambient air line. In the mixer, the ambient air from the ambient air line is mixed with the recirculation air discharged from the aircraft cabin. The mixed air produced in the mixer is finally used to air condition the aircraft cabin.

A cabin exhaust air line is connectable to the aircraft cabin to be air conditioned by the aircraft air conditioning system and—just as the recirculation air line—configured or adapted to be flown through with cabin exhaust air discharged from the aircraft cabin. The aircraft air conditioning system further comprises an ambient air compressor arranged or disposed in the ambient air line for compressing the ambient air flowing through the ambient air line.

A refrigerating apparatus of the aircraft air conditioning system comprises a refrigerant circuit configured or adapted to be flown through with a refrigerant, and a refrigerant compressor arranged or disposed in the refrigerant circuit. The refrigerant circuit is thermally coupled to the ambient air line, preferably by a heat exchanger constructed in the form of an evaporator, for example, in order to transfer heat from the ambient air flowing through the ambient air line to the refrigerant circulating in the refrigerant circuit prior to the supply of ambient air to the mixer. In the aircraft air conditioning system an air conditioning process consequently takes place in which the ambient air is first compressed by the ambient air compressor and is then cooled to a desired temperature by the transfer of heat to the refrigerant circulating in the refrigerant circuit of the refrigerating apparatus. The efficiency of this air conditioning process can be controlled as required by suitable precompression of the ambient air in the ambient air compressor.

The aircraft air conditioning system is further equipped with a turbine, which is coupled to the ambient air compressor and is configured to drive the ambient air compressor. A control device of the aircraft air conditioning system is configured to control the operation of the aircraft air conditioning system in such a way that the turbine is supplied in a first operating state of the aircraft air conditioning system with ambient air from the ambient air line and in a second operating state of the aircraft air conditioning system with cabin exhaust air from the cabin exhaust air line. In the first operating state of the aircraft air conditioning system, the pressure of the precompressed ambient air is thus used to drive the turbine, whereby a portion of the energy used due to the compression of the ambient air can be recovered. In the second operating state of the aircraft air conditioning system, on the other hand, the pressure of the exhaust air discharged from an aircraft cabin, which in flight mode of an aircraft equipped with the aircraft air conditioning system exceeds the ambient pressure outside the aircraft above a certain flight altitude, is used for energy recovery. The energy recovered from the precompressed ambient air and the cabin exhaust air is used to drive the ambient air compressor. The energy consumption of a compressor drive executed, for example, in the form of an electric motor, can be reduced by this.

The control device is preferably configured to control the operation of the aircraft air conditioning system in such a way that in ground operation of an aircraft equipped with the aircraft air conditioning system, the turbine is supplied with ambient air from the ambient air line, and in flight mode of the aircraft equipped with the aircraft air conditioning system the turbine is supplied with cabin exhaust air from the cabin exhaust air line. In ground operation of the aircraft equipped with the aircraft air conditioning system, the ambient air is compressed when flowing through the ambient air compressor preferably to a pressure lying above the target cabin pressure, which permits dehumidification of the ambient air and subsequent use of the ambient air to drive the turbine. The cooling of the ambient air then takes place both by the transfer of heat to the refrigerant circuit of the refrigerating apparatus and by the expansion of the ambient air in the turbine.

In flight mode of the aircraft equipped with the aircraft air conditioning system, the pressure of the exhaust air discharged from the aircraft cabin exceeds the ambient pressure outside the aircraft above a certain flight altitude (approx. 6000 m), on the other hand. In flight mode of the aircraft equipped with the aircraft air conditioning system, in particular above a flight altitude of 6000 m, the turbine can be driven by the cabin exhaust air discharged from the aircraft cabin via the cabin exhaust air line due to this. Energy recovery potential can thereby be optimally utilised both in ground operation and in flight mode of the aircraft.

The turbine is preferably arranged or disposed in a turbine air supply line connected to an inlet of the turbine. In particular, the turbine can be arranged or disposed in the turbine air supply line downstream of a water separator and/or downstream of a reheater. The term "downstream" refers here to the flow direction of the ambient air (in the first operating state of the aircraft air conditioning system) and of the cabin exhaust air (in the second operating state of the aircraft air conditioning system) through the turbine air supply line. Upon flowing through the water separator, the ambient air to be supplied to the turbine in the first operating state of the aircraft air conditioning system can be dehumidified to such an extent that it is ensured that not too much moisture is supplied to the mixer and consequently to the aircraft cabin to be air conditioned.

The reheater in the turbine air supply line serves in particular to heat the ambient air (in the first operating state of the aircraft air conditioning system) or cabin exhaust air (in the second operating state of the aircraft air conditioning system) flowing through the turbine air supply line before it is supplied to the turbine and in particular creates a thermal coupling between the turbine air supply line and a section of the ambient air line situated downstream of the ambient air compressor. The term "downstream" refers here to the flow direction of the ambient air through the ambient air line. The reheater thereby brings the warm ambient air flowing through the ambient air line following its compression in the ambient air compressor into thermal contact with the ambient air or cabin exhaust air flowing through the turbine air supply line before it is supplied to the turbine. In the reheater, drops of water remaining in the ambient air flow or the cabin exhaust air flow can be evaporated to protect the turbine from damage due to droplet impact or cavitation. Furthermore, the reheater increases the power output of the turbine.

In a preferred embodiment of the aircraft air conditioning system, the ambient air line joins the turbine air supply line, in particular upstream of the water separator. The cabin exhaust air line, on the other hand, preferably joins the turbine air supply line upstream of the reheater. This arrangement ensures that the ambient air flowing through the ambient air line is dehumidified in the water separator before it is supplied to the turbine. The cabin exhaust air flowing through the cabin exhaust air line is drier, on the other hand, and does not therefore have to be routed through the water separator.

The aircraft air conditioning system preferably further comprises an ambient air bypass line that is connectable to the ambient air line. The ambient air bypass line can be configured to route the ambient air flowing through the ambient air line past the turbine into the mixer. For example, the ambient air bypass line can be connectable to the ambient air line in the region of a joining point of the ambient air line to the turbine air supply line, so that the ambient air flowing through the ambient air line can be routed optionally either into the turbine air supply line or the ambient air bypass line.

In flight mode, in particular in cruising mode, of an aircraft equipped with the aircraft air conditioning system, dehumidification of the ambient air, which is very dry at cruising altitude of the aircraft, is not necessary before it is supplied to the aircraft cabin. The water separator, the reheater and the turbine can accordingly be bypassed and the ambient air from the ambient air line can be routed directly into the mixer of the aircraft air conditioning system. The cooling of the ambient air then takes place exclusively by the transfer of heat to the refrigerant circuit of the refrigerating apparatus.

In a preferred embodiment, the aircraft air conditioning system further comprises a first control valve arrangement for controlling the supply of ambient air from the ambient air line to the turbine air supply line and the ambient air bypass line. The first control valve arrangement can comprise a control valve arranged or disposed in the turbine air supply line and a control valve arranged or disposed in the bypass ambient air line. Alternatively to this, however, the first control valve arrangement can also be constructed in the form of a 3-way valve arrangement, which is arranged or disposed in the region of a connection point of the ambient air line to the turbine air supply line and the ambient air bypass line. The control device is preferably configured to control the operation of the first control valve arrangement so that the ambient air flowing through the ambient air line is routed in the first operating state of the aircraft air conditioning system to the turbine air supply line and in the second operating state of the aircraft air conditioning system to the ambient air bypass line.

The aircraft air conditioning system preferably further comprises a turbine exhaust air line connected to an outlet of the turbine. The turbine exhaust air line can have a first turbine exhaust air line branch and a second turbine exhaust air line branch. The turbine exhaust air line preferably branches downstream of the turbine into the first turbine exhaust air line branch and the second turbine exhaust air line branch. The term "downstream" refers here to the flow direction of the turbine exhaust air emerging from the outlet of the turbine through the turbine exhaust air line. The first turbine exhaust air line branch is preferably connected to the mixer of the aircraft air conditioning system and can in particular open directly into the mixer.

The second turbine exhaust air line branch can be connected to the aircraft environment, on the other hand, so that turbine exhaust air can be discharged into the aircraft environment via the second turbine exhaust air line branch. For example, the second turbine exhaust air line branch can open into a ram air channel. A liquefier of the refrigerating apparatus and/or a pre-cooler, for example, can be arranged or disposed in the ram air channel. The turbine exhaust air routed into the ram air channel can be used to cool the liquefier and/or the one pre-cooler. The ram air requirement of the aircraft air conditioning system and consequently the aerodynamic resistance caused by the supply of ram air to the aircraft air conditioning system can be reduced by this. This facilitates a reduction in the fuel consumption of the aircraft.

The aircraft air conditioning system preferably further comprises a second control valve arrangement for controlling the supply of turbine exhaust air to the first turbine exhaust air line branch and the second turbine exhaust air line branch. The second control valve arrangement can comprise a control valve arranged or disposed in the first turbine exhaust air line branch and a control valve arranged or disposed in the second turbine exhaust air line branch. Alternatively to this, however, the second control valve arrangement can also be constructed in the form of a 3-way valve arrangement, which is arranged or disposed in the turbine exhaust air line in the region of a branching point of the turbine exhaust air line into the first turbine exhaust air line branch and the second turbine exhaust air line branch.

The control device is preferably configured to control the operation of the second control valve arrangement so that the turbine exhaust air flowing through the turbine exhaust air line is routed in the first operating state of the aircraft air conditioning system via the first turbine exhaust air line branch to the mixer of the aircraft air conditioning system and in the second operating state of the aircraft air conditioning system is discharged via the second turbine exhaust air line branch into the aircraft environment. It is accordingly ensured that the ambient air used in the first operating state of the aircraft air conditioning system to drive the turbine can be routed following its expansion in the turbine into the mixer and from there into the aircraft cabin. Cabin exhaust air used to drive the turbine in the second operating state of the aircraft air conditioning system is discharged preferably into the aircraft environment, on the other hand, following its expansion in the turbine.

In a method for operating an aircraft air conditioning system, ambient air is routed through an ambient air line, which is connected to a mixer of the aircraft air conditioning system, in order to supply ambient air to the mixer. The ambient air flowing through the ambient air line is compressed in an ambient air compressor arranged or disposed in the ambient air line. A refrigerating apparatus is provided, which comprises a refrigerant circuit configured or adapted to be flown through with a refrigerant and a refrigerant compressor arranged or disposed in the refrigerant circuit. The refrigerant circuit of the refrigerating apparatus is thermally coupled to the ambient air line, in order to transfer heat from the ambient air flowing through the ambient air line to the refrigerant circulating in the refrigerant circuit before the ambient air is supplied to the mixer. The operation of the aircraft air conditioning system is controlled in such a way that a turbine, which is coupled to the ambient air compressor and is configured to drive the ambient air compressor, is supplied in a first operating state of the aircraft air conditioning system with ambient air from the ambient air line and in a second operating state of the aircraft air conditioning system with cabin exhaust air from a cabin exhaust air line that is connectable to an aircraft cabin.

The operation of the aircraft air conditioning system is preferably controlled in such a way that the turbine is supplied in ground operation of an aircraft equipped with the aircraft air conditioning system with ambient air from the ambient air line and in flight mode of the aircraft equipped with the aircraft air conditioning system with cabin exhaust air from the cabin exhaust air line.

The operation of a first control valve arrangement can be controlled so that the ambient air flowing through the ambient air line is routed in the first operating state of the aircraft air conditioning system to a turbine air supply line connected to an inlet of the turbine and in the second operating state of the aircraft air conditioning system through an ambient air bypass line past the turbine to the mixer.

The operation of a second control valve arrangement can be controlled so that turbine exhaust air flowing through a turbine exhaust air line connected to an outlet of the turbine is routed in the first operating state of the aircraft air conditioning system via a first turbine exhaust air line branch to the mixer of the aircraft air conditioning system and in the second operating state of the aircraft air conditioning system via a second turbine exhaust air line branch to an aircraft environment.

BRIEF DESCRIPTION OF THE DRAWINGS

A preferred embodiment of the disclosure herein is now explained in greater detail with reference to the enclosed, example schematic drawing, wherein:

FIG. 1 an air conditioning system for air conditioning of an aircraft cabin.

DETAILED DESCRIPTION

An aircraft air conditioning system 10 illustrated in FIG. 1 comprises an ambient air line 12, through which ambient air can flow and which is connected to a mixer 14 of the aircraft air conditioning system 10, to supply ambient air drawn from an aircraft environment 15 to the mixer 14. Control of the supply of ambient air to the ambient air line 12 takes place by a valve 13 arranged or disposed in the ambient air line. In the mixer 14, the ambient air from the ambient air line 12 is mixed with recirculation air discharged from an aircraft cabin 16. The mixed air produced in the mixer 14 is finally used to air condition the aircraft cabin 16.

The aircraft air conditioning system 10 is equipped with a refrigerating apparatus 17, which comprises a refrigerant circuit 18, through which a two-phase refrigerant, for example R134A ($CH_2F-CF_3$), $CO_2$ or R245fa (1,1,1,3,3-pentafluoropropane) flows, and a refrigerant compressor 20 arranged or disposed in the refrigerant circuit 18. The refrigerant compressor 20 is powered by a first electric motor 22. The refrigerant circuit 18 is coupled thermally to the ambient air line, in order to transfer heat from the ambient air flowing through the ambient air line 12 to the refrigerant circulating in the refrigerant circuit 18 before the ambient air is supplied to the mixer 14. Arranged or disposed in the refrigerant circuit 18 apart from the refrigerant compressor 20 are a liquefier 24, a refrigerant collector 26, an expansion valve 28 and an evaporator 30, which couples the refrigerant circuit 18 thermally to the ambient air line 12.

Furthermore, the refrigerant circuit 18 of the refrigerating apparatus 17 is coupled thermally to a recirculation air line 32, through which recirculation air flows and which is connected to the mixer 14 of the aircraft air conditioning system 10, in order to transfer heat from the recirculation air flowing through the recirculation air line 32 to the refrigerant flowing through the refrigerant circuit 18. The thermal coupling between the refrigerant circuit 18 and the recirculation air line 32 is realised by another evaporator 34, which is arranged or disposed in a connection line 36 branching off from the refrigerant collector 26 arranged or disposed in the refrigerant circuit 18. The refrigerant flow through the connection line 36 is controlled by a control valve 38 arranged or disposed in the connection line 36. A further expansion valve 40 is also arranged or disposed in the connection line 36 upstream of the other evaporator 34 with regard to the flow direction of the refrigerant through the refrigerant circuit 18. The pressure and the temperature of the refrigerant flowing through the connection line 36 can be set as desired by the further expansion valve 40 before the refrigerant is routed to the other evaporator 34.

In the aircraft air conditioning system 10 the refrigerating apparatus 17 is thus used not only for cooling the ambient air flowing through the ambient air line 12, but also for cooling recirculation air discharged from the aircraft cabin to be air conditioned. Before it is supplied to the mixer 14 of the aircraft air conditioning system 10, the recirculation air can therefore be cooled to the same low temperature as the ambient air flowing through the ambient air line 12. Cooling of the ambient air to a temperature that lies below a desired target cabin air supply temperature by heat transfer to the refrigerant circulating in the refrigerant circuit 18 of the refrigerating apparatus 17 can consequently be eliminated. Furthermore, operation of the refrigerating apparatus 17 with relatively high minimal refrigerant temperatures is facilitated.

An ambient air compressor 58 for compressing the ambient air flowing through the ambient air line 12 is arranged or disposed in the ambient air line 12. The speed-controlled ambient air compressor 58 is powered by a second electric motor 60. The ambient air compressor 58 is controlled by a control device 46 of the aircraft air conditioning system 10 in such a way that it compresses the ambient air flowing through the ambient air line 12 to a pressure that is greater than the target cabin pressure in the aircraft cabin 16 to be air conditioned. Furthermore, the operation of the ambient air compressor 58 is controlled by the control device 46 in such a way that the temperature of the compressed ambient air does not exceed a maximum temperature of, for example, 160° C.

Arranged or disposed downstream of the ambient air compressor 58 in the ambient air line 12 is a pre-cooler 68 for precooling the ambient air compressed by the ambient air compressor 58. The term "downstream" refers here to the flow direction of the ambient air through the ambient air line 12. The pre-cooler 68 is arranged or disposed in a ram air channel 52 and ram air routed through the ram air channel 52 flows through it in operation of the aircraft air conditioning system 10. Control of the ram air flow through the ram air channel 52 takes place by control of the inlet and outlet flaps 53, which are only indicated schematically in the drawing. In the pre-cooler 68, the ambient air, which was heated by the compression in the ambient air compressor 58, is cooled down again to a desired lower temperature. Downstream of the pre-cooler 68 the ambient air line 12 is coupled thermally to the refrigerant circuit 18 via the evaporator 30 arranged or disposed in the refrigerant circuit 18 of the refrigerating apparatus 17.

Downstream of the ambient air compressor 58 and upstream of the pre-cooler 68 a trim air line 48 branches off from the ambient air line 12. The trim air flow through the trim air line 48 is controlled by a trim air valve 50 arranged or disposed in the trim air line 48.

Apart from the pre-cooler 68, the liquefier 24 of the refrigerating apparatus 17 is also arranged or disposed in the ram air channel 52, wherein the liquefier 24 is positioned upstream of the pre-cooler 68 in the ram air channel 52 with regard to the flow direction of the ram air through the ram air channel 52. In order to ensure a proper flow of ram air through the ram air channel 52 even in ground operation of an aircraft equipped with the aircraft air conditioning system 10, a fan 70 is also arranged or disposed in the ram air channel 52 to convey ram air through the ram air channel 52. The fan 70 is powered by a third electric motor 72.

Downstream of the thermal coupling of the ambient air line 12 to the refrigerant circuit 18 of the refrigerating apparatus 17 by the evaporator 30, the ambient air line 12 joins a turbine air supply line 78. The turbine air supply line 78 is connected to the inlet of a turbine 86. The turbine 86 is coupled to the ambient air compressor 58. In particular, the ambient air compressor 58 and the turbine 86 are arranged or disposed on a common shaft.

A water separator 80 is arranged or disposed in the turbine air supply line 78. Upon flowing through the water separator 80, the ambient air routed from the ambient air line 12 to the turbine air supply line 78 is dehumidified to such an extent that it is ensured that not too much moisture is supplied to the aircraft cabin 16 to be air conditioned. In the water separator 80, water separated from the ambient air is routed via a drainage line 84 into the ram air channel 52 and is injected into the ram air channel 52 via water injection nozzles 87, which are arranged or disposed with regard to the flow direction of the ram air through the ram air channel 52 upstream and downstream of the liquefier 24 of the refrigerating apparatus 17 in the ram air channel 52. Here the water partially evaporates and cools the ram air flowing through the ram air channel 52.

The aircraft air conditioning system 10 further comprises a cabin exhaust air line 74, which is connectable to the aircraft cabin 16 to be air conditioned by the aircraft air conditioning system 10 and—just as with the recirculation air line 32—through which cabin exhaust air discharged from the aircraft cabin 16 can flow. Control of the cabin exhaust air flow through the cabin exhaust air line 74 takes place by a valve 76 arranged or disposed in the cabin exhaust air line 74. Downstream of the water separator 80 with regard to the flow direction of the turbine air supply through the turbine air supply line 78, the cabin exhaust air line 74 joins the turbine air supply line.

A reheater 82 is also arranged or disposed in the turbine air supply line 78 downstream of the opening of the cabin exhaust air line 74 into the turbine air supply line 78. The reheater 82, which is arranged or disposed downstream of the water separator 80 and upstream of the turbine 86 with regard to the flow direction of the turbine air supply through the turbine air supply line 78, serves to heat the turbine air supply flowing through the turbine air supply line 78 before it is supplied to the turbine 86 and creates a thermal coupling between the turbine air supply flowing through the turbine air supply line 78 downstream of the water separator 80 and the warm ambient air flowing through the ambient air line 12 downstream of the ambient air compressor 58. Drops of water remaining in the turbine air supply flow after flowing through the water separator 80 are evaporated in the reheater 82, in order to protect the turbine 86 from damage due to droplet impact or cavitation. Furthermore, the reheater 82 increases the power output of the turbine 86.

The aircraft air conditioning system 10 further comprises an ambient air bypass line 90, which is configured to route the ambient air flowing through the ambient air line 12 past the turbine 86 into the mixer 14 if required. In the aircraft air conditioning system 10 shown in FIG. 1, the ambient air bypass line 90 is connected to the ambient air line 12 in the region of a joining point P of the ambient air line 12 to the turbine air supply line 78. A first control valve arrangement 79 serves to control the supply of ambient air from the ambient air line 12 to the turbine air supply line 78 and the ambient air bypass line 90. By the first control valve arrangement 79 the ambient air flowing through the ambient air line 12 can thus be routed optionally either to the turbine air supply line 78 or the ambient air bypass line 90. The first control valve arrangement 79 comprises a control valve 88 arranged or disposed in the turbine air supply line 78 and a control valve 92 arranged or disposed in the bypass ambient air line 90. Alternatively to this, however, the first control valve arrangement 79 can also be constructed in the form of a 3-way valve arrangement, which can be arranged or disposed in the region of the connection point P of the ambient air line 12 to the turbine air supply line 78 and the ambient air bypass line 90. A non-return valve 91 arranged or disposed in the ambient air bypass line 90 prevents air from being able to flow back out of the mixer 14 into the ambient air bypass line 90.

Connected to an outlet of the turbine 86 is a turbine exhaust air line 94. The turbine exhaust air line 94 has a first turbine exhaust air line branch 94a and a second turbine exhaust air line branch 94b. In particular, the turbine exhaust air line 94 branches downstream of the turbine 86 into the first turbine exhaust air line branch 94a and the second turbine exhaust air line branch 94b. The term "downstream" refers here to the flow direction of the turbine exhaust air emerging from the outlet of the turbine 86 through the turbine exhaust air line 94. The first turbine exhaust air line branch 94a opens into the mixer 14 of the aircraft air conditioning system 10.

The second turbine exhaust air line branch 94b is connected to the aircraft environment 15, on the other hand, so that turbine exhaust air can be discharged into the aircraft environment 15 via the second turbine exhaust air line branch 94b. In the aircraft air conditioning system 10 shown in FIG. 1, the second turbine exhaust air line branch 94b opens into the ram air channel 52, where the turbine exhaust air routed into the ram air channel 52 can be used to cool the liquefier 24 of the refrigerating apparatus 17 and the precooler 68. The ram air requirement of the aircraft air conditioning system 10 can be reduced by this.

The aircraft air conditioning system 10 further comprises a second control valve arrangement 96 for controlling the supply of turbine exhaust air to the first turbine exhaust air line branch 94a and the second turbine exhaust air line branch 94b. The second control valve arrangement 96 is constructed in the form of a 3-way valve arrangement, which is arranged or disposed in the turbine exhaust air line 94 in the region of a branching point of the turbine exhaust air line 94 into the first turbine exhaust air line branch 94a and the second turbine exhaust air line branch 94b. Alternatively to this, however, the second control valve arrangement 96 can also comprise a control valve arranged or disposed in the first turbine exhaust air line branch 94a and a control valve arranged or disposed in the second turbine exhaust air line branch 94b.

The control device 46 of the aircraft air conditioning system 10 controls the operation of the aircraft air conditioning system 10 in such a way that the turbine 86 is supplied in a first operating state of the aircraft air conditioning system 10 with ambient air from the ambient air line 12 and in a second operating state of the aircraft air conditioning system 10 with cabin exhaust air from the cabin exhaust air line 74. In the first operating state of the aircraft air conditioning system 10, the pressure of the precompressed ambient air is thus used to power the turbine 86. In the second operating state of the aircraft air conditioning system 10, on the other hand, the pressure of the exhaust air discharged from an aircraft cabin, which exceeds the ambient pressure outside the aircraft above a certain altitude in flight mode of an aircraft equipped with the aircraft air conditioning system 10, is used for energy recovery. The energy recovered from the precompressed ambient air and the cabin exhaust air is used to drive the ambient air compressor 58. The energy consumption of the electric motor 60 powering the ambient air compressor 58 can be reduced by this.

In particular, the control device 46 controls the operation of the aircraft air conditioning system 10 in such a way that in ground operation of an aircraft equipped with the aircraft air conditioning system 10, the turbine 86 is supplied with ambient air from the ambient air line 12. To this end the control device 46 controls the operation of the first control valve arrangement 79 in ground operation of an aircraft equipped with the aircraft air conditioning system 10, i.e. in the first operating state of the aircraft air conditioning system 10, in such a way that the ambient air flowing through the ambient air line is routed to the turbine air supply line 78. To accomplish this, the control valve 88 arranged or disposed in the turbine air supply line 78 is opened, while the control valve 92 arranged or disposed in the bypass ambient air line 90 is closed. The valve 76 arranged or disposed in the cabin exhaust air line 74 is closed to suppress the supply of cabin exhaust air to the turbine air supply line 78 through the cabin exhaust air line 74.

The control device 46 further controls the ambient air compressor 58 in ground operation of the aircraft equipped with the aircraft air conditioning system 10 in such a way that the ambient air is compressed when flowing through the ambient air compressor 58 to a pressure above the target cabin pressure, which facilitates dehumidification of the ambient air and subsequent use of the ambient air to drive the turbine 86. Cooling of the ambient air then takes place both by the transfer of heat to the refrigerant circuit 18 of the refrigerating apparatus 17 and by the expansion of the ambient air in the turbine 86.

Moreover, in ground operation of an aircraft equipped with the aircraft air conditioning system 10, i.e. in the first operating state of the aircraft air conditioning system 10, the operation of the second control valve arrangement 96 is controlled by the control device 46 so that the turbine exhaust air flowing through the turbine exhaust air line 94 is routed into the mixer 14 of the aircraft air conditioning system 10 via the first turbine exhaust air line branch 94a and is used to air condition the aircraft cabin 16. This is accomplished in that the second 3-way control valve arrangement 96 is controlled into a position in which it releases the first turbine exhaust air line branch 94a, while it closes the second turbine exhaust air line branch 94b.

In flight mode of the aircraft equipped with the aircraft air conditioning system 10, on the other hand, the pressure of the exhaust air discharged from the aircraft cabin exceeds the ambient pressure outside the aircraft above a certain flight altitude (approx. 6000 m). The control device 46 therefore controls the operation of the aircraft air conditioning system 10 in such a way that in flight mode of the aircraft equipped with the aircraft air conditioning system 10, i.e. in the second operating state of the aircraft air conditioning system 10, the turbine 86 is driven by the cabin exhaust air discharged from the aircraft cabin 16 via the cabin exhaust air line 74. To this end the control device 46 controls the operation of the aircraft air conditioning system 10 in its second operating state in such a way that in flight mode of the aircraft equipped with the aircraft air conditioning system 10, cabin exhaust air is supplied to the turbine 86 from the cabin exhaust air line 74. The valve 76 arranged or disposed in the cabin exhaust air line 74 is accordingly opened in order to permit the supply of cabin exhaust air through the cabin exhaust air line 74 to the turbine air supply line 78.

At the same time, the operation of the first control valve arrangement 79 is controlled by the control device 46 in such a way that the ambient air flowing through the ambient air line 12 is routed via the ambient air bypass line 90 directly into the mixer 14. To accomplish this, the control valve 88 arranged or disposed in the turbine air supply line 78 is closed, while the control valve 92 arranged or disposed in the bypass ambient air line 90 is opened. In flight mode, especially in cruising mode, of an aircraft equipped with the aircraft air conditioning system 10, dehumidification of the ambient air, which is very dry at cruising altitude of the aircraft, is not necessary before it is supplied to the aircraft cabin 16. The water separator 80, the reheater 82 and the turbine 86 can accordingly be bypassed and the ambient air from the ambient air line 12 can be routed directly into the mixer 14 of the aircraft air conditioning system 10. Cooling of the ambient air then takes place exclusively by the transfer of heat to the refrigerant circuit 18 of the refrigerating apparatus 17.

Finally, in the second operating state of the aircraft air conditioning system 10, i.e. in flight mode of an aircraft equipped with the aircraft air conditioning system 10, the control device 46 controls the operation of the second control valve arrangement 96 in such a way that the turbine exhaust air flowing through the turbine exhaust air line 94 is discharged into the aircraft environment via the second turbine exhaust air line branch 94b. It is accordingly ensured that the cabin exhaust air used in the second operating state of the aircraft air conditioning system 10 to drive the turbine 86 is discharged into the aircraft environment following its expansion in the turbine 86.

By way of the ambient air compressor 58 compressing the ambient air flowing through the ambient air line 12 to a pressure that is greater than the target cabin pressure of the aircraft cabin 16 to be air conditioned, the turbine 86 also facilitates the realisation of a cold air process in which the ambient air flowing through the ambient air line 12 is initially compressed and then expanded again and cooled by this. In the aircraft air conditioning system 10, either exclusively the vapor compression process operating in the refrigerating apparatus 17 (for example, in flight mode of an aircraft equipped with the aircraft air conditioning system 10 at a flight altitude of over 6000 m) or both the vapor compression process and the cold air process (for example, in ground operation of an aircraft equipped with the aircraft air conditioning system 10 or in flight mode of the aircraft up to a flight altitude of 6000 m) can be used accordingly to condition and cool the ambient air flowing through the ambient air line 12.

Finally, by turning off the refrigerating apparatus 17, operation of the aircraft air conditioning system 10 with exclusive use of the cold air process is also possible. This can make sense, for example, if the aircraft cabin 16 is to be heated by the aircraft air conditioning system 10. Operation of the aircraft air conditioning system 10 with exclusive use of the cold air process is also possible as emergency mode if the refrigerating apparatus 17 fails.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or is priority.

The invention claimed is:

1. An aircraft air conditioning system comprising:
    an ambient air line configured to have ambient air flown therethrough, the ambient air line being connected to a mixer of the aircraft air conditioning system to supply the mixer with ambient air;
    a cabin exhaust air line, which is connectable to an aircraft cabin and configured to have cabin exhaust air flown therethrough;
    an ambient air compressor in the ambient air line for compressing the ambient air flowing through the ambient air line;
    a refrigerating apparatus comprising a refrigerant circuit configured to have a refrigerant circulated therethrough and a refrigerant compressor disposed in the refrigerant circuit, wherein the refrigerant circuit is thermally coupled to the ambient air line to transfer heat from the ambient air flowing through the ambient air line to the refrigerant in the refrigerant circuit before the ambient air is supplied to the mixer; and
    a turbine coupled to the ambient air compressor, the turbine being configured to drive the ambient air compressor,
    wherein the aircraft air conditioning system is operable in a first operating state, in which the turbine is supplied with the ambient air from the ambient air line, and a second operating state, in which the turbine is supplied with the cabin exhaust air from the cabin exhaust air line.

2. The aircraft air conditioning system according to claim 1,
    wherein, during a ground operation of an aircraft equipped with the aircraft air conditioning system, the turbine is supplied with ambient air from the ambient air line, and, during a flight mode of the aircraft equipped with the aircraft air conditioning system, the turbine is supplied with cabin exhaust air from the cabin exhaust air line.

3. The aircraft air conditioning system according to claim 1,
    wherein the turbine is arranged in a turbine air supply line connected to an inlet of the turbine downstream of a water separator or downstream of a reheater.

4. The aircraft air conditioning system according to claim 3,
    wherein the ambient air line joins the turbine air supply line upstream of the water separator or wherein the cabin exhaust air line joins the turbine air supply line upstream of the reheater.

5. The aircraft air conditioning system according to claim 3, wherein the ambient air line joins the turbine air supply line upstream of the water separator and wherein the cabin exhaust air line joins the turbine air supply line upstream of the reheater.

6. The aircraft air conditioning system according to claim 1, wherein the turbine is arranged in a turbine air supply line connected to an inlet of the turbine that is downstream of a water separator and downstream of a reheater.

7. The aircraft air conditioning system according to claim 6, wherein the ambient air line joins the turbine air supply line upstream of the water separator or wherein the cabin exhaust air line joins the turbine air supply line upstream of the reheater.

8. The aircraft air conditioning system according to claim 6, wherein the ambient air line joins the turbine air supply line upstream of the water separator and wherein the cabin exhaust air line joins the turbine air supply line upstream of the reheater.

9. The aircraft air conditioning system according to claim 1,
comprising an ambient air bypass line, which is connectable to the ambient air line and is configured to route the ambient air flowing through the ambient air line past the turbine and into the mixer.

10. The aircraft air conditioning system according to claim 9,
comprising a first control valve arrangement, wherein, in the first operating state of the aircraft air conditioning system, the ambient air flowing through the ambient air line is routed by the first control valve arrangement to the turbine air supply line and, in the second operating state of the aircraft air conditioning system, the ambient air flowing through the ambient air line is routed by the first control valve arrangement to the ambient air bypass line.

11. The aircraft air conditioning system according to claim 1,
comprising a turbine exhaust air line connected to an outlet of the turbine with a first turbine exhaust air line branch and a second turbine exhaust air line branch, wherein the first turbine exhaust air line branch is connected to the mixer of the aircraft air conditioning system and the second turbine exhaust air line branch is connected to an aircraft environment.

12. The aircraft air conditioning system according to claim 11,
comprising a second control valve arrangement, wherein, in the first operating state of the aircraft air conditioning system, the turbine exhaust air flowing through the turbine exhaust air line is routed, by the second control valve arrangement, through the first turbine exhaust air line branch to the mixer of the aircraft air conditioning system and, in the second operating state of the aircraft air conditioning system, the turbine exhaust air flowing through the turbine exhaust air line is routed, by the second control valve arrangement, through the second turbine exhaust air line branch to the aircraft environment.

13. A method for operating an aircraft air conditioning system, the method comprising:
flowing ambient air through an ambient air line, which is connected to a mixer of the aircraft air conditioning system to supply the mixer with ambient air;
compressing the ambient air flowing through the ambient air line via an ambient air compressor that is in the ambient air line;
circulating a refrigerant through a refrigerant circuit of a refrigerating apparatus, which also comprises a refrigerant compressor that is disposed in the refrigerant circuit;
thermally coupling the refrigerant circuit of the refrigerating apparatus to the ambient air line to transfer heat from the ambient air flowing through the ambient air line to the refrigerant circulating in the refrigerant circuit before the ambient air is supplied to the mixer;
coupling a turbine to the ambient air compressor;
driving the ambient air compressor with the turbine; and
supplying, when the aircraft air conditioning system is in a first operating state, the turbine with ambient air from the ambient air line and, when the aircraft air conditioning system is in a second operating state, the turbine with cabin exhaust air from the cabin exhaust air line, wherein the cabin exhaust air line is connectable to an aircraft cabin.

14. The method according to claim 13, comprising:
supplying, during a ground operation of an aircraft equipped with the aircraft air conditioning system, the turbine with ambient air from the ambient air line; and
supplying, during a flight mode of the aircraft equipped with the aircraft air conditioning system, the turbine with cabin exhaust air from the cabin exhaust air line.

15. The method according to claim 13, comprising:
routing, using a first control valve arrangement, the ambient air flowing through the ambient air line to a turbine air supply line connected to an inlet of the turbine when the aircraft air conditioning system is in the first operating state; and
routing, using the first control valve arrangement, the ambient air flowing through the ambient air line through an ambient air bypass line, past the turbine, and into the mixer when the aircraft air conditioning system is in the second operating state.

16. The method according to claim 13, comprising:
routing, using a second control valve arrangement, turbine exhaust air flowing through a turbine exhaust air line, which is connected to an outlet of the turbine, to the mixer of the aircraft air conditioning system via a first turbine exhaust air line branch when the aircraft air conditioning system is in the first operating state; and
routing, using the second control valve arrangement, the turbine exhaust air flowing through the turbine exhaust air line to an aircraft environment via a second turbine exhaust air line branch when the aircraft air conditioning system is in the second operating state.

17. The method according to claim 13, comprising connecting a turbine exhaust air line to an outlet of the turbine with a first turbine exhaust air line branch and a second turbine exhaust air line branch, wherein the first turbine exhaust air line branch is connected to the mixer of the aircraft air conditioning system and the second turbine exhaust air line branch is connected to an aircraft environment.

18. The method according to claim 13, comprising connecting an ambient air bypass line to the ambient air line to route the ambient air flowing through the ambient air line past the turbine and into the mixer.

19. The method according to claim 13, wherein the turbine is arranged in a turbine air supply line connected to an inlet of the turbine downstream of a water separator or downstream of a reheater.

20. The method according to claim 13, wherein the ambient air line joins the turbine air supply line upstream of the water separator or wherein the cabin exhaust air line joins the turbine air supply line upstream of the reheater.

* * * * *